(12) United States Patent
Matsuda et al.

(10) Patent No.: US 12,734,909 B2
(45) Date of Patent: Sep. 15, 2026

(54) POWER SUPPLY ASSISTANCE APPARATUS, VEHICLE, AND POWER SUPPLY DEVICE

(71) Applicant: TOYOTA JIDOSHA KABUSHIKI KAISHA, Aichi-ken (JP)

(72) Inventors: Kazuhisa Matsuda, Sunto-gun (JP); Shuntaro Okazaki, Sunto-gun (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1081 days.

(21) Appl. No.: 17/835,967

(22) Filed: Jun. 9, 2022

(65) Prior Publication Data

US 2022/0402379 A1 Dec. 22, 2022

(30) Foreign Application Priority Data

Jun. 17, 2021 (JP) ................................ 2021-101166

(51) Int. Cl.

| | |
|---|---|
| ***B60L 53/12*** | (2019.01) |
| ***B60L 53/38*** | (2019.01) |
| ***B60L 53/62*** | (2019.01) |
| ***B60L 53/66*** | (2019.01) |
| ***H02J 50/12*** | (2016.01) |
| ***H02J 50/80*** | (2016.01) |
| ***H02J 50/90*** | (2016.01) |

(52) U.S. Cl.

CPC ............... *B60L 53/12* (2019.02); *B60L 53/38* (2019.02); *B60L 53/62* (2019.02); *B60L 53/66* (2019.02); *H02J 50/12* (2016.02); *H02J 50/80* (2016.02); *H02J 50/90* (2016.02)

(58) Field of Classification Search

CPC .......... B60L 53/12; B60L 53/38; B60L 53/62; B60L 53/66; B60L 9/16; B60L 5/00; B60L 2210/10; B60L 2210/14; B60L 2210/30; H02J 50/12; H02J 50/80; H02J 50/90; H02J 7/02; Y02T 10/70; Y02T 10/7072; Y02T 90/12; Y02T 90/14

See application file for complete search history.

(56) References Cited

U.S. PATENT DOCUMENTS

| | | | | |
|---|---|---|---|---|
| 2014/0139038 | A1 | 5/2014 | Konno et al. | |
| 2020/0021144 | A1* | 1/2020 | Budhia | B60L 53/12 |

FOREIGN PATENT DOCUMENTS

| | | | | |
|---|---|---|---|---|
| CN | 103563217 | A | 2/2014 | |
| CN | 105431323 | A | 3/2016 | |
| CN | 111800206 | A | 10/2020 | |
| JP | 2018157686 | A | 10/2018 | |
| JP | 20190161860 | A * | 9/2019 | H02J 50/10 |
| WO | 2015/020885 | A2 | 2/2015 | |

* cited by examiner

*Primary Examiner* — Rachid Bendidi
*Assistant Examiner* — Kirsten Jade M Santos
(74) *Attorney, Agent, or Firm* — HAUPTMAN HAM, LLP

(57) ABSTRACT

A power supply assistance apparatus includes a processor. The processor is configured to acquire an output of a magnetic field detector configured to detect a magnetic field around a power supply device installed in a ground. The processor is configured to instruct a vehicle to change a frequency of an alternating-current magnetic field emitted from the vehicle to the power supply device as a position signal based on the output of the magnetic field detector.

9 Claims, 12 Drawing Sheets

FIG. 7

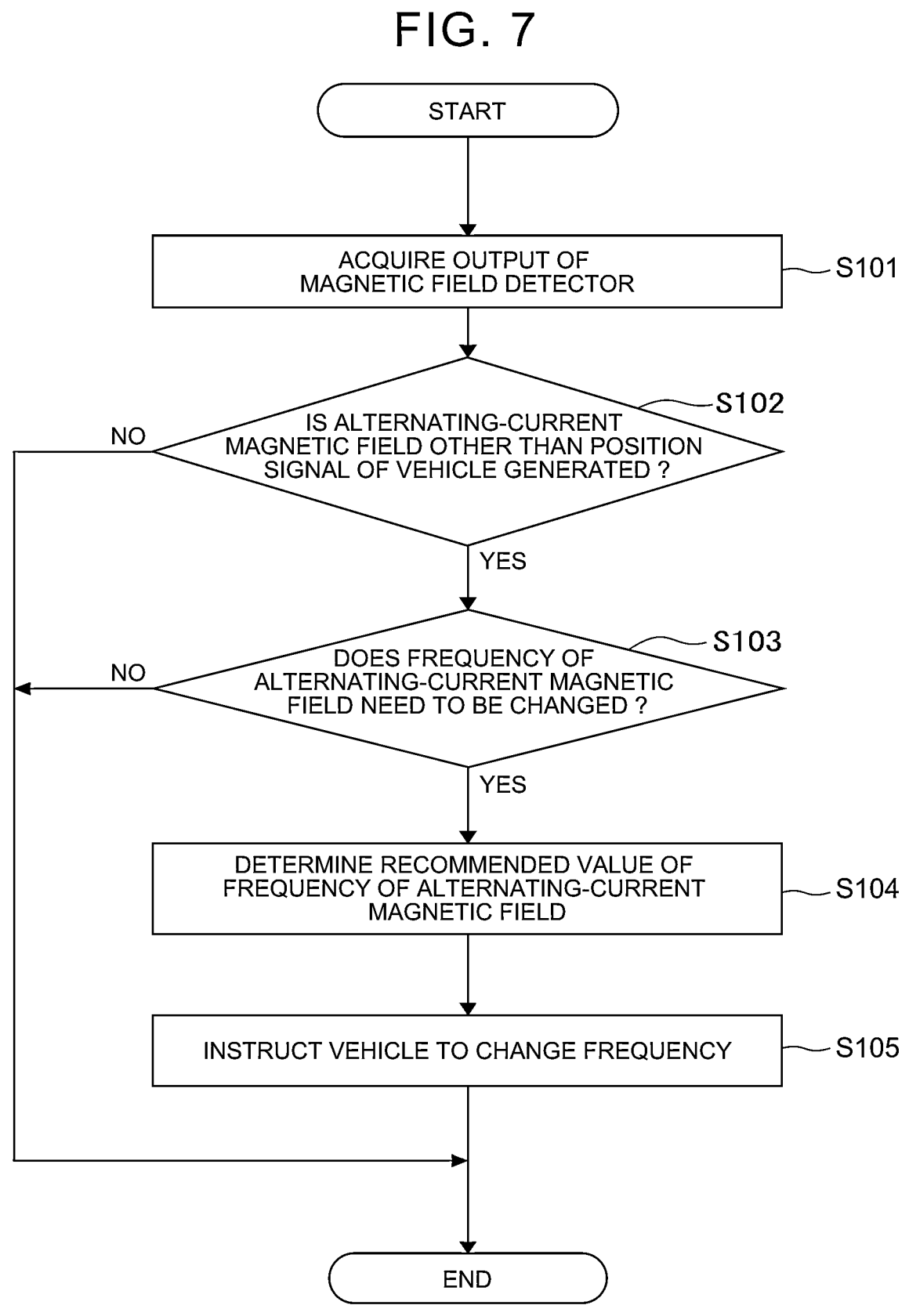

START

ACQUIRE OUTPUT OF MAGNETIC FIELD DETECTOR — S101

S102: IS ALTERNATING-CURRENT MAGNETIC FIELD OTHER THAN POSITION SIGNAL OF VEHICLE GENERATED ? (NO → END; YES → S103)

S103: DOES FREQUENCY OF ALTERNATING-CURRENT MAGNETIC FIELD NEED TO BE CHANGED ? (NO → END; YES → S104)

DETERMINE RECOMMENDED VALUE OF FREQUENCY OF ALTERNATING-CURRENT MAGNETIC FIELD — S104

INSTRUCT VEHICLE TO CHANGE FREQUENCY — S105

END

FIG. 10

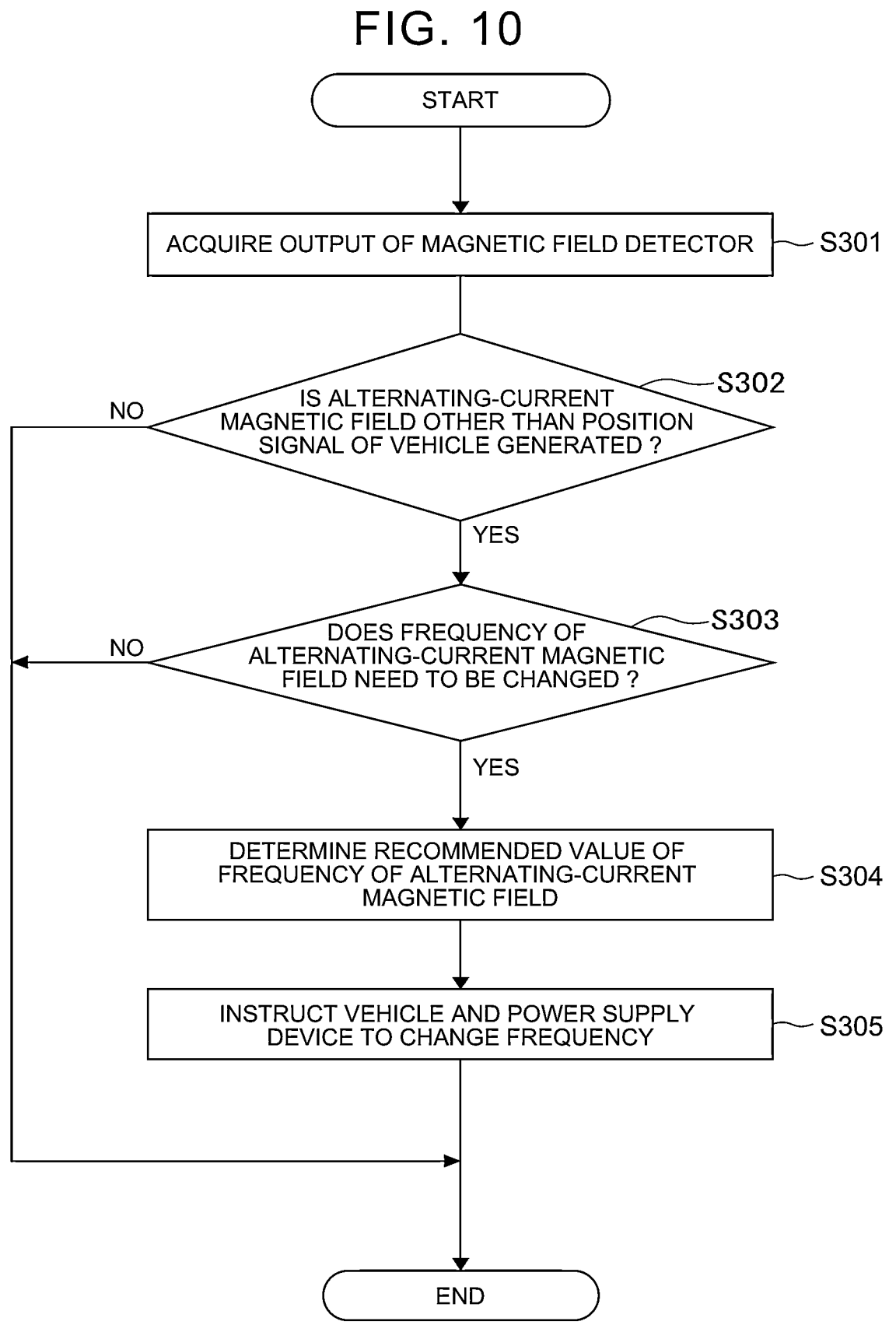

START

ACQUIRE OUTPUT OF MAGNETIC FIELD DETECTOR S301

IS ALTERNATING-CURRENT MAGNETIC FIELD OTHER THAN POSITION SIGNAL OF VEHICLE GENERATED ? S302

NO

YES

DOES FREQUENCY OF ALTERNATING-CURRENT MAGNETIC FIELD NEED TO BE CHANGED ? S303

NO

YES

DETERMINE RECOMMENDED VALUE OF FREQUENCY OF ALTERNATING-CURRENT MAGNETIC FIELD S304

INSTRUCT VEHICLE AND POWER SUPPLY DEVICE TO CHANGE FREQUENCY S305

END

POWER SUPPLY ASSISTANCE APPARATUS, VEHICLE, AND POWER SUPPLY DEVICE

CROSS-REFERENCE TO RELATED APPLICATION

This application claims priority to Japanese Patent Application No. 2021-101166 filed on Jun. 17, 2021, incorporated herein by reference in its entirety.

BACKGROUND

1. Technical Field

The present disclosure relates to a power supply assistance apparatus, a vehicle, and a power supply device.

2. Description of Related Art

There is known a technology to transfer electric power in a noncontact manner between a vehicle and a power supply device installed in a ground. For example, Japanese Unexamined Patent Application Publication No. 2018-157686 (JP 2018-157686 A) describes that a power supply request is wirelessly transmitted from a vehicle to a power supply device and then electric power is supplied from the power supply device to the vehicle in a noncontact manner in response to the power supply request.

SUMMARY

However, when an approach of the vehicle to the power supply device is detected through wireless communication, an alternating-current magnetic field may not be generated at appropriate timing due to interference of an obstacle or the like with wireless communication.

The inventors of the subject application diligently made a study and finally found that an alternating-current magnetic field was used as a position signal of a vehicle. However, when a source that generates an alternating-current magnetic field, other than a vehicle, is present around a power supply device, the alternating-current magnetic field generated around the power supply device may interfere with detection of the vehicle.

The disclosure provides a power supply assistance apparatus, a vehicle, and a power supply device that can reduce the influence of an alternating-current magnetic field generated around a power supply device, on detection of a vehicle at the time of supplying electric power from the power supply device to the vehicle in a noncontact manner.

A first aspect of the disclosure relates to a power supply assistance apparatus. The power supply assistance apparatus includes a processor. The processor is configured to acquire an output of a magnetic field detector configured to detect a magnetic field around a power supply device installed in a ground. The processor is configured to instruct a vehicle to change a frequency of an alternating-current magnetic field emitted from the vehicle to the power supply device as a position signal based on the output of the magnetic field detector.

In the power supply assistance apparatus according to the first aspect, the processor may be configured to instruct the vehicle to change the frequency of the alternating-current magnetic field by transmitting a recommended value of the frequency of the alternating-current magnetic field to the vehicle.

In the power supply assistance apparatus according to the first aspect, the processor may be configured to transmit the recommended value to the vehicle and the power supply device.

In the power supply assistance apparatus according to the first aspect, the power supply device may be configured to supply electric power in a noncontact manner through magnetic resonance coupling, and the processor may be configured to set the recommended value to a value different from a resonant frequency of the magnetic resonance coupling.

In the power supply assistance apparatus according to the first aspect, the processor may be configured to instruct the vehicle to change the frequency of the alternating-current magnetic field emitted to the power supply device when a difference between the frequency of the alternating-current magnetic field emitted to the power supply device and a frequency of an alternating-current magnetic field detected by the magnetic field detector is less than a predetermined value.

A second aspect of the disclosure relates to a vehicle configured to be supplied with electric power in a noncontact manner from a power supply device installed in a ground. The vehicle includes an alternating-current magnetic field generating circuit configured to generate an alternating-current magnetic field as a position signal of the vehicle, and a controller configured to change a frequency of the alternating-current magnetic field based on a magnetic field around the power supply device, detected by a magnetic field detector.

A third aspect of the disclosure relates to a power supply device configured to supply electric power to a vehicle in a noncontact manner. The power supply device includes a magnetic field detector configured to detect a magnetic field around the power supply device, and a controller configured to extract an alternating-current magnetic field having a specific frequency from an output of the magnetic field detector and detect an approach of the vehicle to the power supply device based on the alternating-current magnetic field having the specific frequency. The controller is configured to change the specific frequency based on a magnetic field around the power supply device, detected by the magnetic field detector or another magnetic field detector.

According to the aspects of the present disclosure, it is possible to reduce the influence of an alternating-current magnetic field generated around a power supply device, on detection of a vehicle at the time of supplying electric power from the power supply device to the vehicle in a noncontact manner.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a flowchart showing a control routine that is executed in the server according to the first embodiment;

FIG. 10 is a flowchart showing a control routine that is executed in the server according to the second embodiment;

DETAILED DESCRIPTION OF EMBODIMENTS

Figure 1:
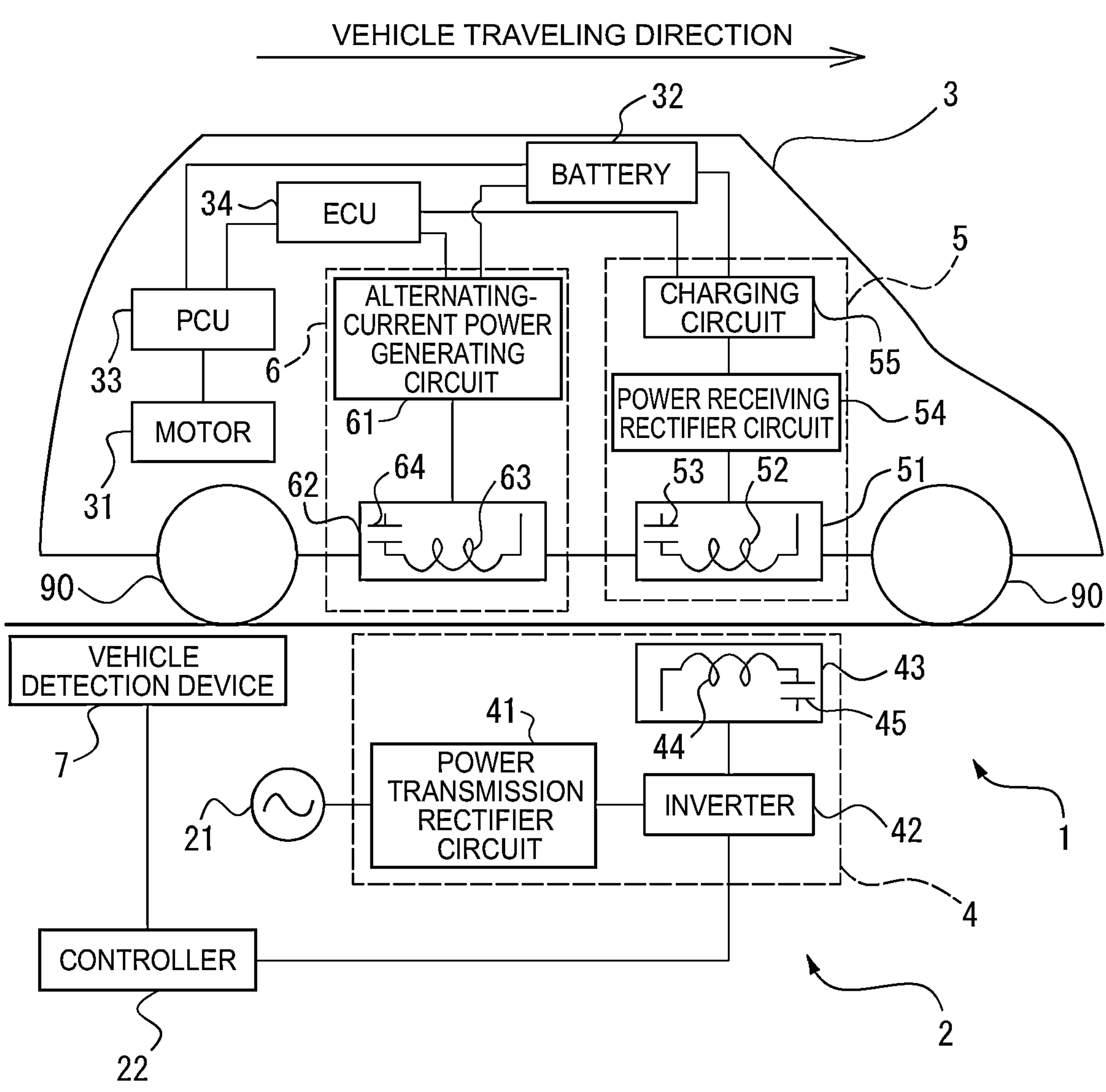
FIG. 1 is a diagram schematically showing the configuration of a noncontact power supply system according to a first embodiment of the present disclosure.

Hereinafter, embodiments of the present disclosure will be described in detail with reference to the accompanying drawings. In the following description, like reference numerals denote similar components.

First Embodiment

Hereinafter, a first embodiment of the present disclosure will be described with reference to FIG. 1 to FIG. 8.

FIG. 1 is a diagram schematically showing the configuration of a noncontact power supply system 1 according to the first embodiment of the present disclosure. The noncontact power supply system 1 includes a power supply device 2 installed in a ground, and a vehicle 3. The noncontact power supply system 1 supplies electric power in a noncontact manner between the power supply device 2 and the vehicle 3. Particularly, in the present embodiment, the noncontact power supply system 1 supplies electric power in a noncontact manner from the power supply device 2 to the vehicle 3 through magnetic resonance coupling (magnetic resonance) when the vehicle 3 is running. In other words, the noncontact power supply system 1 transfers electric power from the power supply device 2 to the vehicle 3 by using a magnetic field as a medium. Noncontact power supply is also called noncontact power transfer, wireless power transfer, or wireless power supply.

The power supply device 2 is configured to supply electric power to the vehicle 3 in a noncontact manner. The vehicle 3 is configured to be supplied with electric power in a noncontact manner from the power supply device 2. Specifically, the power supply device 2 includes a power transmission device 4 configured to transmit electric power in a noncontact manner. The vehicle 3 includes a power receiving device 5 configured to receive electric power in a noncontact manner from the power transmission device 4.

As shown in FIG. 1, the power supply device 2 includes a power supply 21 and a controller 22 in addition to the power transmission device 4. The power supply device 2 is installed in a road (lane) on which the vehicle 3 passes, and is buried, for example, underground (under a road surface). At least part (for example, the power supply 21 and the controller 22) of the power supply device 2 may be disposed on the road surface.

The power supply 21 is a power source for the power transmission device 4 and supplies electric power to the power transmission device 4. The power supply 21 is, for example, a commercial alternating current power supply that supplies single-phase alternating-current power. The power supply 21 may be, for example, an alternating current power supply that supplies three-phase alternating-current power.

The power transmission device 4 includes a power transmission rectifier circuit 41, an inverter 42, and a power transmission resonant circuit 43. In the power transmission device 4, alternating-current power (high-frequency power) for generating an alternating-current magnetic field is supplied to the power transmission resonant circuit 43 via the power transmission rectifier circuit 41 and the inverter 42.

The power transmission rectifier circuit 41 is electrically connected to the power supply 21 and the inverter 42. The power transmission rectifier circuit 41 rectifies alternating-current power supplied from the power supply 21 to convert the alternating-current power to direct-current power and supplies the direct-current power to the inverter 42. The power transmission rectifier circuit 41 is, for example, an AC-DC converter.

The inverter 42 is electrically connected to the power transmission rectifier circuit 41 and the power transmission resonant circuit 43. The inverter 42 converts direct-current power supplied from the power transmission rectifier circuit 41 to alternating-current power with a frequency higher than that of the alternating-current power of the power supply 21 (high-frequency power) and supplies the high-frequency power to the power transmission resonant circuit 43.

The power transmission resonant circuit 43 includes a resonator made up of a coil 44 and a capacitor 45. Various parameters of the coil 44 and capacitor 45 (the outside diameter and inside diameter of the coil 44, the number of turns of the coil 44, the capacitance of the capacitor 45, and the like) are determined such that the resonant frequency of the power transmission resonant circuit 43 becomes a predetermined set value. The predetermined set value is, for example, 10 kHz to 100 GHz and may be 85 kHz determined by SAE TIR J2954 standard as a frequency band for noncontact power transfer.

The power transmission resonant circuit 43 is disposed in the center of a lane on which the vehicle 3 passes such that the center of the coil 44 is located in the center of the lane. When the high-frequency power supplied from the inverter 42 is applied to the power transmission resonant circuit 43, the power transmission resonant circuit 43 generates an alternating-current magnetic field for transmitting electric power. The power supply 21 may be a direct-current power supply, such as a fuel cell and a solar cell, and, in this case, the power transmission rectifier circuit 41 may be omitted.

The controller 22 is, for example, a general-purpose computer and executes various controls over the power supply device 2. For example, the controller 22 is electrically connected to the inverter 42 of the power transmission device 4 and controls the inverter 42 in order to control power transmission with the power transmission device 4.

Figure 2:
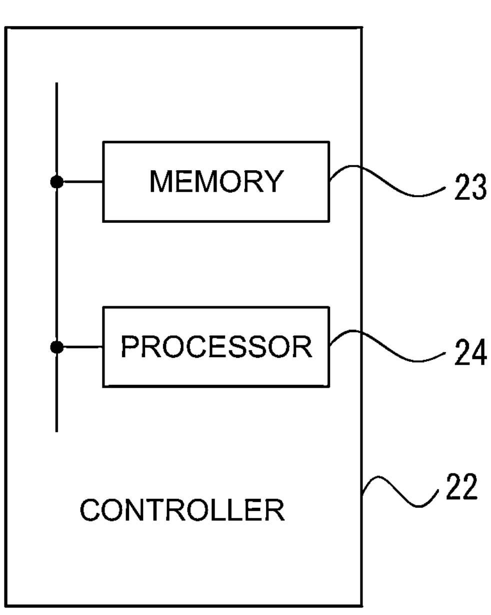
FIG. 2 is a schematic configuration diagram of a controller of a power supply device.

FIG. 2 is a schematic configuration diagram of the controller 22. The controller 22 includes a memory 23 and a processor 24. The memory 23 and the processor 24 are connected to each other via a signal line. The controller 22 may have, for example, a communication interface that allows communication between the power supply device 2 and devices outside the power supply device 2. The controller 22 is an example of a controller of the power supply device 2.

The memory 23 includes, for example, a volatile semiconductor memory (for example, RAM) and a nonvolatile semiconductor memory (for example, ROM). The memory 23 stores programs that are run by the processor 24, various data that is used when various processes are executed by the processor 24, and the like.

The processor 24 includes one or more central processing units (CPUs) and their peripheral circuits and executes various processes. The processor 24 may further include an arithmetic circuit, such as a logic unit and a numerical unit.

On the other hand, as shown in FIG. 1, the vehicle 3 includes a motor 31, a battery 32, a power control unit (PCU) 33, and an electronic control unit (ECU) 34 in addition to the power receiving device 5. In the present embodiment, the vehicle 3 is a battery electric vehicle (BEV) not equipped with an internal combustion engine, and the motor 31 outputs drive power.

The motor 31 is, for example, an alternating-current synchronous motor and functions as an electric motor and a generator. When the motor 31 functions as an electric motor, the motor 31 is driven by using electric power stored in the battery 32 as a power source. The output of the motor 31 is transmitted to wheels 90 via a speed reduction gear and axles. On the other hand, when the vehicle 3 decelerates, the motor 31 is driven by the rotation of the wheels 90, and the motor 31 functions as a generator to generate regenerative electric power.

The battery 32 is a rechargeable secondary battery and is, for example, a lithium ion battery, a nickel-metal hydride battery, or the like. The battery 32 stores electric power used to drive the vehicle 3 (for example, the drive power of the motor 31). When regenerative electric power generated by the motor 31 is supplied to the battery 32, the battery 32 is charged, and the state of charge (SOC) of the battery 32 recovers. The battery 32 may be chargeable from an external power supply other than the power supply device 2 via a charging port provided in the vehicle 3.

The PCU 33 is electrically connected to the battery 32 and the motor 31. The PCU 33 includes an inverter, a step-up converter, and a DC-DC converter. The inverter converts direct-current power supplied from the battery 32 to alternating-current power and supplies the alternating-current power to the motor 31. On the other hand, the inverter converts alternating-current power generated by the motor 31 (regenerative electric power) to direct-current power and supplies the direct-current power to the battery 32. The step-up converter steps up the voltage of the battery 32 as needed when electric power stored in the battery 32 is supplied to the motor 31. The DC-DC converter steps down the voltage of the battery 32 when electric power stored in the battery 32 is supplied to an electronic device, such as a headlight.

The power receiving device 5 includes a power receiving resonant circuit 51, a power receiving rectifier circuit 54, and a charging circuit 55. The power receiving device 5 receives electric power from the power transmission device 4 and supplies the received electric power to the battery 32.

The power receiving resonant circuit 51 is disposed at the bottom of the vehicle 3 such that a distance to a road surface is small. In the present embodiment, the power receiving resonant circuit 51 is disposed in the center of the vehicle 3 in a vehicle width direction and is disposed between the front wheels 90 and the rear wheels 90 in a front and rear direction of the vehicle 3.

The power receiving resonant circuit 51 has a similar configuration to the power transmission resonant circuit 43 and includes a resonator made up of a coil 52 and a capacitor 53. Various parameters of the coil 52 and capacitor 53 (the outside diameter and inside diameter of the coil 52, the number of turns of the coil 52, the capacitance of the capacitor 53, and the like) are determined such that the resonant frequency of the power receiving resonant circuit 51 coincides with the resonant frequency of the power transmission resonant circuit 43. When a deviation between the resonant frequency of the power receiving resonant circuit 51 and the resonant frequency of the power transmission resonant circuit 43 is small, that is, when, for example, the resonant frequency of the power receiving resonant circuit 51 falls within the range of ±20% of the resonant frequency of the power transmission resonant circuit 43, the resonant frequency of the power receiving resonant circuit 51 does not necessarily need to coincide with the resonant frequency of the power transmission resonant circuit 43.

When an alternating-current magnetic field occurs in the power transmission resonant circuit 43 when the power receiving resonant circuit 51 faces the power transmission resonant circuit 43 as shown in FIG. 1, the vibration of the alternating-current magnetic field transmits to the power receiving resonant circuit 51 that resonates at the same resonant frequency as that of the power transmission resonant circuit 43. As a result, induced current flows through the power receiving resonant circuit 51 by electromagnetic induction, and induced electromotive force is generated in the power receiving resonant circuit 51 by induced current. The induced electromotive force generated in the power receiving resonant circuit 51 is collected by the battery 32 via the power receiving rectifier circuit 54 and the charging circuit 55. In other words, the power transmission resonant circuit 43 transmits electric power to the power receiving resonant circuit 51, and the power receiving resonant circuit 51 receives electric power from the power transmission resonant circuit 43.

The power receiving rectifier circuit 54 is electrically connected to the power receiving resonant circuit 51 and the charging circuit 55. The power receiving rectifier circuit 54 rectifies alternating-current power supplied from the power receiving resonant circuit 51 and converts the alternating-current power to direct-current power, and supplies the direct-current power to the charging circuit 55. The power receiving rectifier circuit 54 is, for example, an AC-DC converter.

The charging circuit 55 is electrically connected to the power receiving rectifier circuit 54 and the battery 32. The charging circuit 55 converts direct-current power supplied from the power receiving rectifier circuit 54 to the voltage level of the battery 32 and supplies the direct-current power to the battery 32. When electric power transmitted from the power transmission device 4 is supplied to the battery 32 by the power receiving device 5, the battery 32 is charged, and the SOC of the battery 32 recovers. The charging circuit 55 is, for example, a DC-DC converter.

The ECU 34 executes various controls over the vehicle 3. For example, the ECU 34 is electrically connected to the charging circuit 55 of the power receiving device 5 and controls the charging circuit 55 in order to control charging of the battery 32 with electric power transmitted from the power transmission device 4. The ECU 34 is electrically connected to the PCU 33 and controls the PCU 33 in order to control exchange of electric power between the battery 32 and an in-vehicle device (for example, the motor 31).

Figure 3:
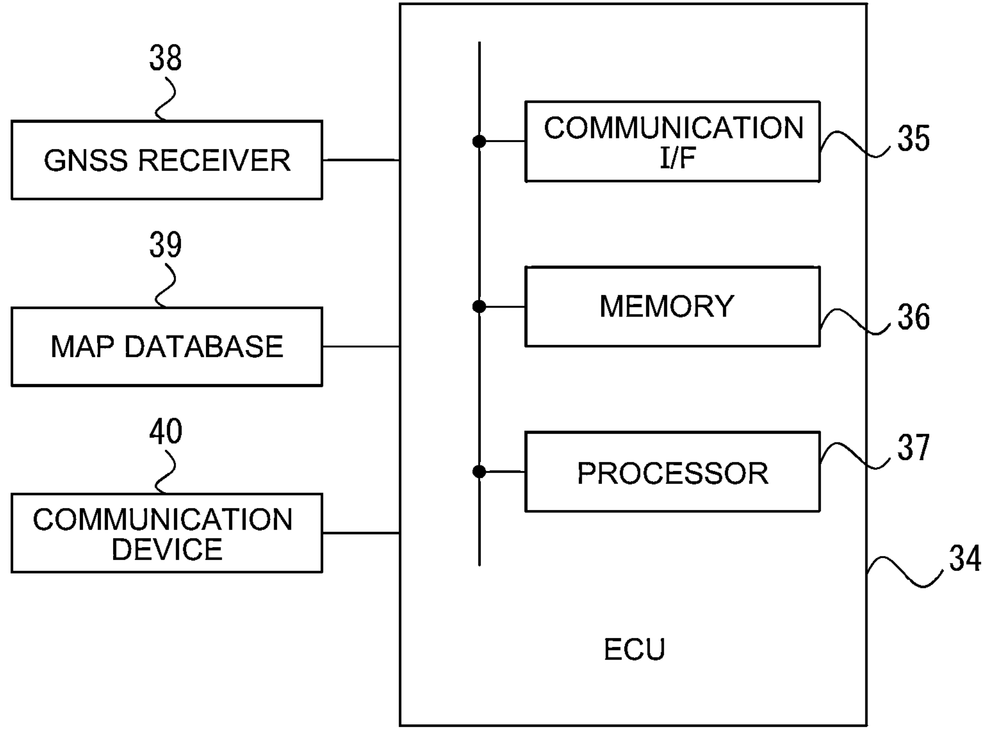
FIG. 3 is a diagram showing the schematic configuration of an ECU of a vehicle and other in-vehicle devices.

FIG. 3 is a diagram showing the schematic configuration of the ECU 34 and other in-vehicle devices. The ECU 34 includes a communication interface 35, a memory 36, and a processor 37. The communication interface 35, the memory 36, and the processor 37 are connected to one another via a signal line. The ECU 34 is an example of a controller of the vehicle 3.

The communication interface 35 includes an interface circuit for connecting the ECU 34 to an in-vehicle network compliant with the standard of controller area network (CAN), or the like.

The memory 36 includes, for example, a volatile semiconductor memory (for example, RAM) and a nonvolatile semiconductor memory (for example, ROM). The memory 36 stores programs that are run by the processor 37, various data that is used when various processes are executed by the processor 37, and the like.

The processor 37 includes one or more central processing units (CPUs) and their peripheral circuits and executes various processes. The processor 37 may further include an arithmetic circuit, such as a logic unit and a numerical unit.

As shown in FIG. 3, the vehicle 3 further includes a GNSS receiver 38, a map database 39, and a communication device 40. The GNSS receiver 38, the map database 39, and the communication device 40 are electrically connected to the ECU 34.

The GNSS receiver 38 detects the current location of the vehicle 3 (for example, the latitude and longitude of the vehicle 3) based on positioning information obtained from a plurality of (for example, three or more) positioning satellites. Specifically, the GNSS receiver 38 captures a plurality of positioning satellites and receives radio waves transmitted from the positioning satellites. The GNSS receiver 38 calculates a distance to each positioning satellite based on a difference between transmission time and receiving time of a radio wave, and detects the current location of the vehicle 3 based on the distance to each positioning satellite and the location of each positioning satellite (orbit information). The output of the GNSS receiver 38, that is, the current location of the vehicle 3, detected by the GNSS receiver 38, is transmitted to the ECU 34.

A global navigation satellite system (GNSS) is a generic name of satellite positioning systems, including GPS in U.S.A., GLONASS in Russia, Galileo in Europe, QZSS in Japan, BeiDou in China, and IRNSS in India. Therefore, the GNSS receiver 38 includes a GPS receiver.

The map database 39 stores map information. The map information includes the location information and the like of the power supply device 2. The ECU 34 acquires map information from the map database 39. The map database 39 may be provided outside the vehicle 3 (for example, a server or the like), and the ECU 34 may acquire map information from the outside of the vehicle 3.

The communication device 40 is a device that allows communication between the vehicle 3 and a device outside the vehicle 3 (for example, a near field communication module, a data communication module (DCM) for connecting the vehicle 3 to a communication network, such as the Internet, or the like). The ECU 34 communicates with a device outside the vehicle 3 via the communication device 40.

As described above, in the noncontact power supply system 1, electric power is supplied to the vehicle 3 in a noncontact manner via an alternating-current magnetic field generated by the power supply device 2. However, constantly generating an alternating-current magnetic field in the power supply device 2 for noncontact power supply leads to a waste of electric power. The influence of an alternating-current magnetic field on electronic devices and the like is also concerned.

Therefore, it is desirable to generate an alternating-current magnetic field for power supply at appropriate timing at which the vehicle 3 passes over the power supply device 2. However, when an approach of the vehicle 3 to the power supply device 2 is detected through wireless communication, an alternating-current magnetic field may not be generated at appropriate timing due to interference of an obstacle or the like with wireless communication.

Therefore, in the present embodiment, the noncontact power supply system 1 includes a position signal transmission device 6 and a vehicle detection device 7, and detects an approach of the vehicle 3 to the power supply device 2 by using the position signal transmission device 6 and the vehicle detection device 7. As shown in FIG. 1, the position signal transmission device 6 is provided in the vehicle 3, and the vehicle detection device 7 is provided in the power supply device 2.

The position signal transmission device 6 transmits the position signal of the vehicle 3 to the power supply device 2. As shown in FIG. 1, the position signal transmission device 6 includes an alternating-current power generating circuit 61 and an alternating-current magnetic field generating circuit 62. The position signal transmission device 6 generates an alternating-current magnetic field as the position signal of the vehicle 3. The position signal transmission device 6 may transmit the identification information (for example, vehicle ID) of the vehicle 3 in addition to the position signal of the vehicle 3 to the power supply device 2 via the alternating-current magnetic field.

The alternating-current power generating circuit 61 is electrically connected to the battery 32 and the alternating-current magnetic field generating circuit 62. The alternating-current power generating circuit 61 generates alternating-current power and supplies the alternating-current power to the alternating-current magnetic field generating circuit 62. For example, the alternating-current power generating circuit 61 includes an oscillator circuit and an amplifier. The oscillator circuit is made up of, for example, an inverter and converts direct-current power supplied from the battery 32 to alternating-current power with a predetermined frequency. The amplifier amplifies electric power (alternating-current power) output from the oscillator circuit.

As shown in FIG. 1, the alternating-current magnetic field generating circuit 62 is disposed at the bottom of the vehicle 3 such that the distance from a road surface is short. In the present embodiment, the alternating-current magnetic field generating circuit 62 is disposed in the center of the vehicle 3 in the vehicle width direction, and is disposed on the rear side of the power receiving resonant circuit 51 in the front and rear direction of the vehicle 3. The alternating-current magnetic field generating circuit 62 may be disposed at the same position as the power receiving resonant circuit 51 or on the front side of the power receiving resonant circuit 51 in the front and rear direction of the vehicle 3.

The alternating-current magnetic field generating circuit 62 has a similar configuration to the power transmission resonant circuit 43 and the power receiving resonant circuit 51 and includes a resonator made up of a coil 63 and a capacitor 64. When alternating-current power supplied from the alternating-current power generating circuit 61 is applied to the alternating-current magnetic field generating circuit 62, the alternating-current magnetic field generating circuit 62 generates an alternating-current magnetic field as the position signal of the vehicle 3.

As shown in FIG. 1, the alternating-current power generating circuit 61 is electrically connected to the ECU 34, and the ECU 34 controls the alternating-current power generating circuit 61. The alternating-current power generating circuit 61 converts direct-current power supplied from the battery 32 to alternating-current power based on a command from the ECU 34 and supplies the alternating-current power to the alternating-current magnetic field generating circuit 62.

For example, the ECU 34 controls the alternating-current power generating circuit 61 and generates an alternating-current magnetic field by using the alternating-current magnetic field generating circuit 62 when the distance between the power supply device 2 and the vehicle 3 becomes shorter than or equal to a predetermined value. The distance between the power supply device 2 and the vehicle 3 is calculated by, for example, comparing the current location of the vehicle 3, detected by the GNSS receiver 38, with the location of the power supply device 2, stored in the map database 39. When the ECU 34 receives a predetermined signal from a roadside device provided before the power supply device 2 via the communication device 40, the ECU 34 may control the alternating-current power generating circuit 61 and generate an alternating-current magnetic field by using the alternating-current magnetic field generating circuit 62. Alternatively, when the vehicle 3 is running, the ECU 34 may constantly generate a weak alternating-current magnetic field by using the alternating-current magnetic field generating circuit 62.

The PCU 33 may function as the alternating-current power generating circuit 61. In this case, the PCU 33 is electrically connected to the alternating-current magnetic field generating circuit 62, and the ECU 34 controls the PCU 33 to generate an alternating-current magnetic field by using the alternating-current magnetic field generating circuit 62.

In the present embodiment, the vehicle detection device 7 is configured as a magnetic field detector that detects a magnetic field around the power supply device 2. The vehicle detection device 7 is, for example, a magneto-impedance (MI) sensor. The drive power of the vehicle detection device 7 is supplied from, for example, the power supply 21 or the like to the vehicle detection device 7 via a drive circuit. The vehicle detection device 7 may be a Hall sensor, a magneto resistive (MR) sensor, or the like.

The vehicle detection device 7 is placed before the power transmission resonant circuit 43 of the power transmission device 4 in the traveling direction of the vehicle 3 in a road in which the power transmission device 4 is provided, and is disposed in the center of a lane in which the vehicle 3 passes. The vehicle detection device 7 is disposed underground (under a road surface) or on the road surface. When an alternating-current magnetic field is generated as a position signal from the vehicle 3 that approaches the power supply device 2, the vehicle detection device 7 detects an alternating-current magnetic field emitted from the vehicle 3. A plurality of the vehicle detection devices 7 may be disposed in a direction perpendicular to the traveling direction of the vehicle 3.

The vehicle detection device 7 is electrically connected to the controller 22, and the output of the vehicle detection device 7 is transmitted to the controller 22. The controller 22 detects an approach of the vehicle 3 to the power supply device 2 based on the output of the vehicle detection device 7 and controls noncontact power supply from the power supply device 2 to the vehicle 3. Specifically, the controller 22 extracts an alternating-current magnetic field having a specific frequency from the output of the vehicle detection device 7 and detects an approach of the vehicle 3 to the power supply device 2 based on the extracted alternating-current magnetic field having the specific frequency. The specific frequency is the frequency of an alternating-current magnetic field emitted from the vehicle 3 as a position signal and corresponds to the frequency of an alternating-current magnetic field to be detected. In the present embodiment, by using the alternating-current magnetic field as the position signal of the vehicle 3 in this way, it is possible to reduce the influence of an obstacle in transmitting and receiving the position signal.

In the present embodiment, the frequency of the alternating-current magnetic field used as the position signal is different from the resonant frequency of the power transmission resonant circuit 43 or the resonant frequency of the power receiving resonant circuit 51. For this reason, it is easy to distinguish between an alternating-current magnetic field generated for power supply in the power transmission resonant circuit 43 of the power supply device 2 and an alternating-current magnetic field generated in the alternating-current magnetic field generating circuit 62 of the vehicle 3. Therefore, by using an alternating-current magnetic field having a frequency different from the frequency of an alternating-current magnetic field for power supply as the position signal of the vehicle 3, it is possible to accurately detect the vehicle 3 that approaches the power supply device 2.

The frequency of an alternating-current magnetic field used as a position signal may be set to a value lower than the resonant frequency of the power transmission resonant circuit 43 or the resonant frequency of the power receiving resonant circuit 51. With this configuration, it is possible to further easily generate an alternating-current magnetic field used as a position signal. When, for example, the resonant frequency of each of the power transmission resonant circuit 43 and the power receiving resonant circuit 51 is 85 kHz, the frequency of an alternating-current magnetic field for position detection is set in the range of 50 Hz to 50 kHz, for example, 1 kHz.

However, when a source that generates an alternating-current magnetic field (for example, an electronic device or the like), other than the vehicle 3, is present around the power supply device 2, the alternating-current magnetic field generated around the power supply device 2 may interfere with detection of the vehicle 3. In the present embodiment, the frequency of an alternating-current magnetic field emitted from the vehicle 3 to the power supply device 2 as a position signal is changed in accordance with the frequency of an alternating-current magnetic field generated around the power supply device 2.

Figure 4:
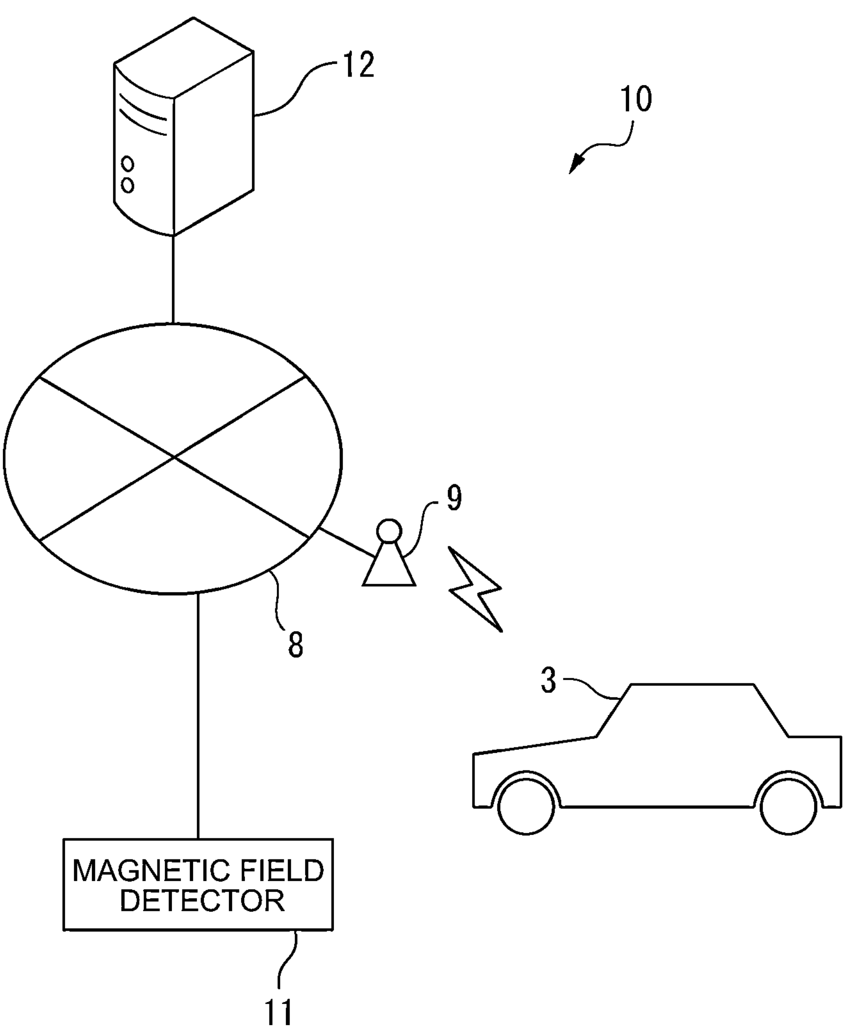
FIG. 4 is a diagram schematically showing a power supply assistance system according to a first embodiment of the present disclosure.

FIG. 4 is a diagram schematically showing a power supply assistance system 10 according to the first embodiment of the present disclosure. The power supply assistance system 10 assists noncontact power supply from the power supply device 2 to the vehicle 3 by optimizing the frequency of an alternating-current magnetic field emitted from the vehicle 3 to the power supply device 2 as a position signal. As shown in FIG. 4, the power supply assistance system 10 includes a magnetic field detector 11 and a server 12. The server 12 is an example of a power supply assistance apparatus.

The magnetic field detector 11 is provided around the power supply device 2 and detects a magnetic field around the power supply device 2. The magnetic field detector 11 is provided in each installation area in which the power supply device 2 is installed. In other words, when there is a plurality of installation areas in which the power supply device 2 is installed, the magnetic field detector 11 is provided in each of the installation areas.

The magnetic field detector 11 is, for example, a magneto-impedance (MI) sensor. The magnetic field detector 11 may be a Hall sensor, a magneto resistive (MR) sensor, or the like.

The magnetic field detector 11 includes a communication interface and is connected to the communication network 8 via the communication interface. The output of the magnetic field detector 11, that is, a magnetic field around the power supply device 2, detected by the magnetic field detector 11, is transmitted to the server 12 via the communication network 8.

Figure 5:
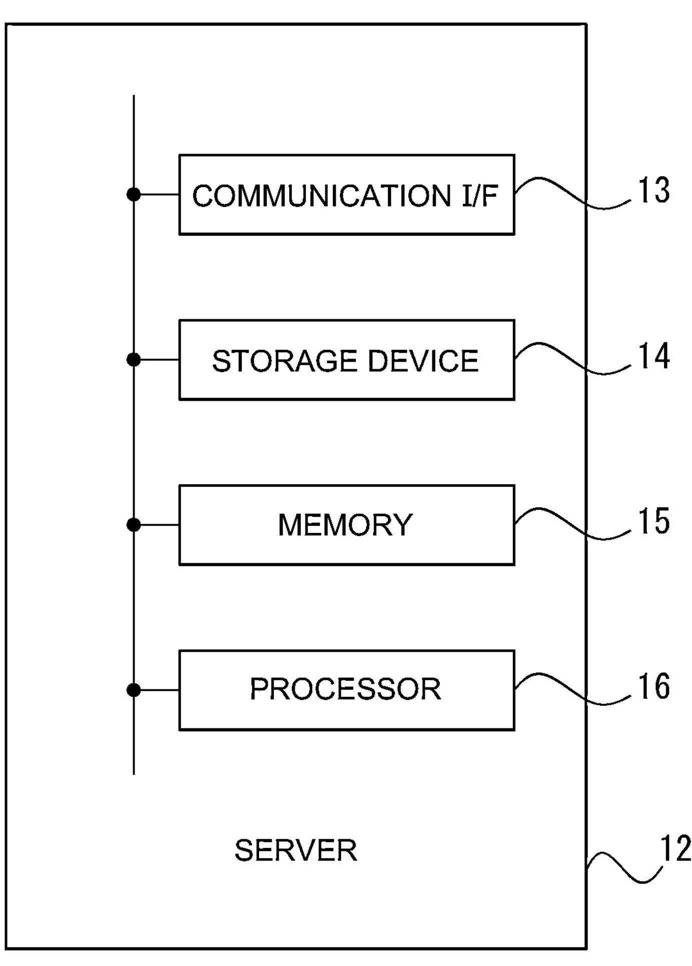
FIG. 5 is a diagram schematically showing the configuration of a server.

FIG. 5 is a diagram schematically showing the configuration of the server 12. The server 12 includes a communication interface 13, a storage device 14, a memory 15, and a processor 16. The communication interface 13, the storage device 14, and the memory 15 are connected to the processor 16 via a signal line. The server 12 may further include an input device, such as a keyboard and a mouse, an output device, such as a display, and the like. The server 12 may be made up of a plurality of computers.

The communication interface 13 has an interface circuit for connecting the server 12 to the communication network 8 and allows communication between the server 12 and a device outside the server 12. The server 12 is capable of communicating with the vehicle 3 via the communication network 8 and a wireless base station 9. The communication interface 13 is an example of a communication unit of the server 12.

The storage device 14 includes, for example, a hard disk drive (HDD), a solid state drive (SSD), or an optical recording medium, and its access device. The storage device 14 stores various data and stores, for example, a computer program or the like by which the processor 16 executes various processes. The storage device 14 is an example of a storage unit of the server 12.

The memory 15 has a nonvolatile semiconductor memory (for example, RAM). The memory 15 temporarily stores various data and the like used when, for example, the processor 16 executes various processes. The memory 15 is an example of a storage unit of the server 12.

The processor 16 includes one or more CPUs and their peripheral circuits and executes various processes. The processor 16 may further include another arithmetic circuit, such as a logic unit, a numerical unit, and a graphics processing unit.

Figure 6:
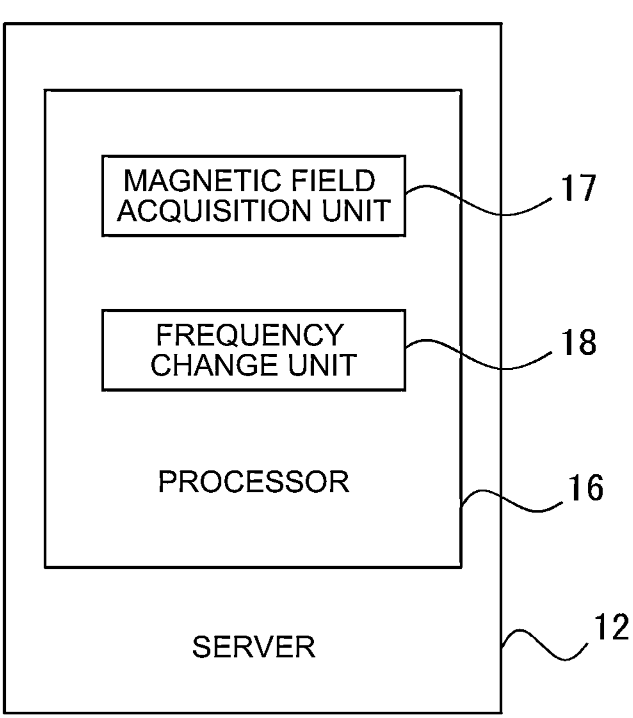
FIG. 6 is a functional block diagram of a processor of a server according to the first embodiment.

FIG. 6 is a functional block diagram of the processor 16 of the server 12 according to the first embodiment. In the present embodiment, the processor 16 includes a magnetic field acquisition unit 17 and a frequency change unit 18. The magnetic field acquisition unit 17 and the frequency change unit 18 are function modules implemented by the processor 16 of the server 12 running a computer program stored in the storage device 14 of the server 12. The magnetic field acquisition unit 17 and the frequency change unit 18 may be implemented by a dedicated arithmetic circuit provided in the processor 16.

The magnetic field acquisition unit 17 acquires the output of the magnetic field detector 11. The frequency change unit 18 instructs the vehicle 3 to change the frequency of an alternating-current magnetic field emitted from the vehicle 3 to the power supply device 2 as a position signal based on the output of the magnetic field detector 11. The ECU 34 of the vehicle 3 changes the frequency of an alternating-current magnetic field emitted from the vehicle 3 to the power supply device 2, based on the instruction from the server 12. In other words, the ECU 34 changes the frequency of an alternating-current magnetic field emitted from the vehicle 3 to the power supply device 2, based on a magnetic field around the power supply device 2, detected by the magnetic field detector 11. Therefore, in the present embodiment, the frequency of an alternating-current magnetic field that corresponds to the position signal of the vehicle 3 is set in consideration of a magnetic field around the power supply device 2, so it is possible to reduce the influence of a magnetic field generated around the power supply device 2 on vehicle detection.

Hereinafter, the above-described control will be described in detail with reference to the flowcharts of FIG. 7 and FIG. 8. FIG. 7 is a flowchart showing a control routine that is executed in the server 12 according to the first embodiment. The control routine is repeatedly executed at predetermined execution intervals by the processor 16 of the server 12. When a plurality of installation areas in which the power supply device 2 is installed and the magnetic field detector 11 is provided, the control routine is executed for each of the installation areas.

Initially, in step S101, the magnetic field acquisition unit 17 acquires the output of the magnetic field detector 11, transmitted from the magnetic field detector 11 to the server 12 via the communication network 8.

Subsequently, in step S102, the frequency change unit 18 determines whether an alternating-current magnetic field other than the position signal of the vehicle 3 is generated around the power supply device 2 based on the output of the magnetic field detector 11. When, for example, the alternating-current magnetic field detected by the magnetic field detector 11 does not include the identification information of the vehicle 3, the frequency change unit 18 determines that an alternating-current magnetic field other than the position signal of the vehicle 3 is generated around the power supply device 2.

When an alternating-current magnetic field is detected by the magnetic field detector 11 when there is no vehicle 3 around the power supply device 2, the frequency change unit 18 may determine that an alternating-current magnetic field other than the position signal of the vehicle 3 is generated around the power supply device 2. In this case, the frequency change unit 18 determines whether there is any one of the vehicles 3 around the power supply device 2 based on, for example, the location information of the vehicle 3, periodically transmitted from each of the vehicles 3 to the server 12 (for example, the current location of the vehicle 3, detected by the GNSS receiver 38 of the vehicle 3). Alternatively, a metal detector, a photoelectric sensor (for example, a diffuse reflection photoelectric sensor), or a detector like a camera may be provided around the power supply device 2 together with the magnetic field detector 11, and the frequency change unit 18 may determine whether there is any one of the vehicles 3 around the power supply device 2 based on the output of the detector.

When the frequency change unit 18 determines in step S102 that no alternating-current magnetic field other than the position signal of the vehicle 3 is generated, the control routine ends. On the other hand, when the frequency change unit 18 determines in step S102 that an alternating-current magnetic field other than the position signal of the vehicle 3 is generated, the control routine proceeds to step S103.

In step S103, the frequency change unit 18 determines whether the frequency of an alternating-current magnetic field emitted from the vehicle 3 to the power supply device 2 as a position signal needs to be changed. When, for example, the difference between the frequency of the alternating-current magnetic field emitted to the power supply device 2 and the frequency of the alternating-current magnetic field detected by the magnetic field detector 11 is less than a predetermined value, the frequency change unit 18 determines that the frequency of the alternating-current magnetic field needs to be changed. The predetermined value is determined in advance in consideration of the degree of influence of an alternating-current magnetic field generated from a source other than the vehicle 3 on vehicle detection. When the difference is less than the predetermined value and the strength of the alternating-current magnetic field detected by the magnetic field detector 11 is greater than or equal to a predetermined threshold, the frequency change unit 18 may determine that the frequency of the alternating-current magnetic field needs to be changed.

When the frequency change unit 18 determines in step S103 that the frequency of the alternating-current magnetic field does not need to be changed, the control routine ends. On the other hand, when the frequency change unit 18 determines in step S103 that the frequency of the alternating-current magnetic field needs to be changed, the control routine proceeds to step S104.

In step S104, the frequency change unit 18 determines a recommended value of the frequency of an alternating-current magnetic field emitted from the vehicle 3 to the power supply device 2 such that the frequency of the alternating-current magnetic field emitted from the vehicle 3 to the power supply device 2 is different from the frequency of the alternating-current magnetic field detected by the magnetic field detector 11. For example, the frequency change unit 18 calculates a recommended value by shifting a currently set value of the frequency of the alternating-current magnetic field by a predetermined amount. At this time, in the present embodiment, the frequency change unit 18 sets the recommended value to a value different from the resonant frequency (for example, 85 kHz) of magnetic resonance coupling. With this configuration, after the frequency is changed as well, it is possible to easily distinguish between an alternating-current magnetic field emitted to the power supply device 2 and an alternating-current magnetic field generated in the power transmission resonant circuit 43 of the power supply device 2.

The recommended value may be set to a value lower than the resonant frequency of magnetic resonance coupling. With this configuration, it is possible to further easily generate an alternating-current magnetic field emitted to the power supply device 2. A plurality of choices may be prepared in advance as the frequency of an alternating-current magnetic field, and the frequency change unit 18 may select a frequency different from the frequency of the alternating-current magnetic field detected by the magnetic field detector 11, from among the choices as a recommended value.

In step S105, the frequency change unit 18 instructs the vehicle 3 to change the frequency of an alternating-current magnetic field emitted from the vehicle 3 to the power supply device 2. Specifically, the frequency change unit 18 instructs the vehicle 3 to change the frequency of an alternating-current magnetic field by transmitting a recommended value to the vehicle 3. When there is a plurality of the vehicles 3 equipped with the power receiving device 5, the frequency change unit 18 instructs each of the vehicles 3 to change the frequency of an alternating-current magnetic field.

The frequency change unit 18 may instruct only a specific vehicle 3 of the vehicles 3 to change the frequency of an alternating-current magnetic field. For example, the frequency change unit 18 may instruct the vehicle 3 scheduled to be supplied with electric power in a noncontact manner from the power supply device 2, for example, only the vehicle 3 running toward the power supply device 2 in a lane in which the power supply device 2 is installed, to change the frequency of an alternating-current magnetic field. In this case, the location and running direction of the vehicle 3 are identified based on the location information of the vehicle 3, periodically transmitted from each of the vehicles 3 to the server 12 (for example, the current location of the vehicle 3, detected by the GNSS receiver 38 of the vehicle 3. After step S105, the control routine ends.

Figure 8:
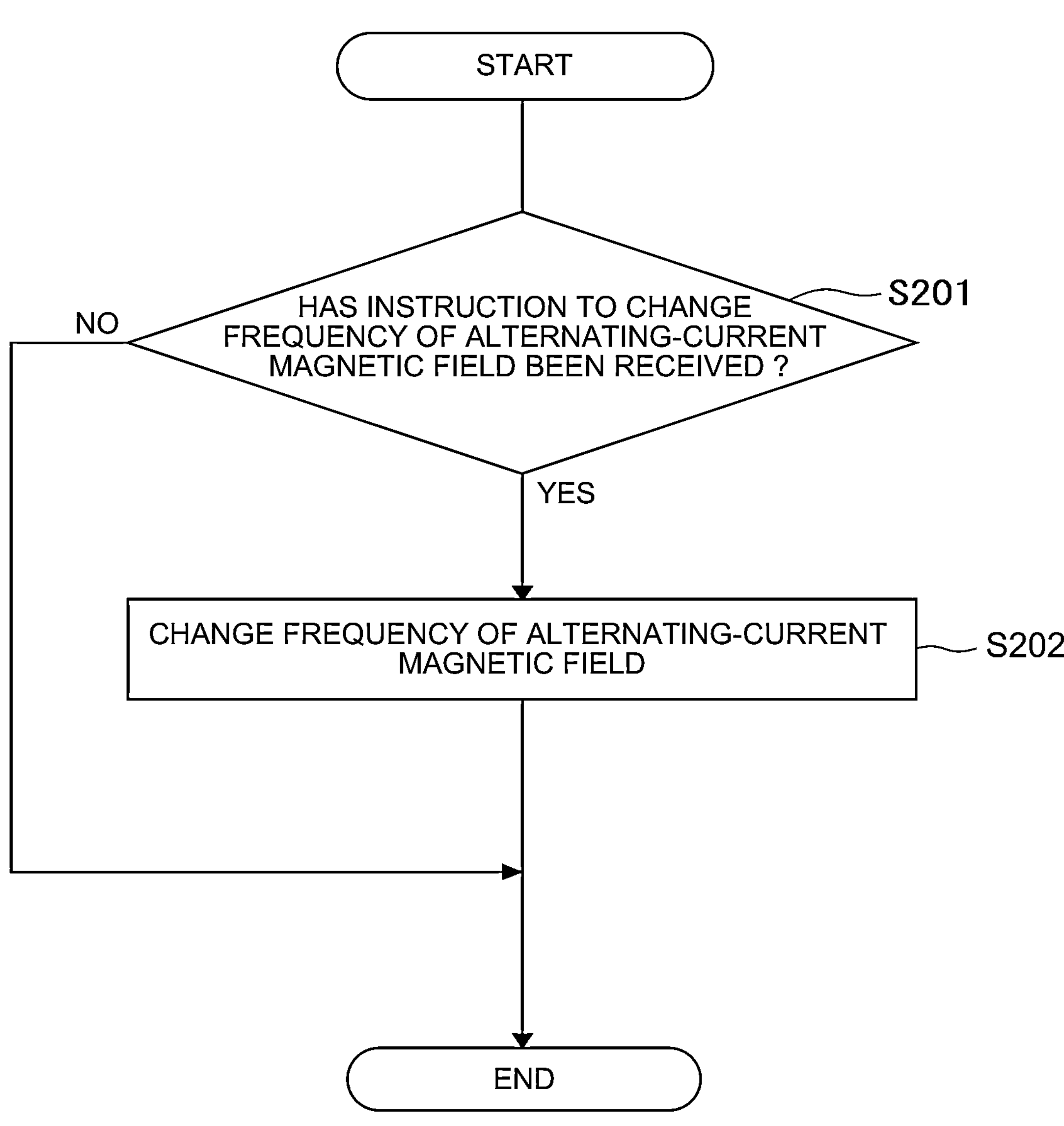
FIG. 8 is a flowchart showing a control routine that is executed in the vehicle according to the first embodiment.

FIG. 8 is a flowchart showing a control routine that is executed in the vehicle 3 according to the first embodiment. The control routine is repeatedly executed at predetermined execution intervals by the processor 37 of the ECU 34 of the vehicle 3.

Initially, in step S201, the processor 37 determines whether an instruction to change the frequency of the alternating-current magnetic field has been received from the server 12. When the processor 37 determines that an instruction to change the frequency has not been received, the control routine ends. On the other hand, when the processor 37 determines that an instruction to change the frequency has been received, the control routine proceeds to step S202.

In step S202, the processor 37 changes the frequency of an alternating-current magnetic field emitted from the vehicle 3 to the power supply device 2 as a position signal, that is, the frequency of an alternating-current magnetic field generated by the alternating-current magnetic field generating circuit 62 when the vehicle 3 approaches the power supply device 2. Specifically, the processor 37 changes the frequency of the alternating-current magnetic field from a currently set value to the recommended value transmitted from the server 12. When the processor 37 changes the frequency of the alternating-current magnetic field, the processor 37 changes the output frequency of the alternating-current power generating circuit 61 by, for example, changing settings of PWM control in the inverter of the alternating-current power generating circuit 61 (for example, a counter value of a clock frequency of a switch for switching the sign of an output voltage or the like). After step S202, the control routine ends.

Step S104 of FIG. 7 may be omitted, and the value (recommended value) of a changed frequency does not need to be included in an instruction to change the frequency, transmitted from the server 12 to the vehicle 3. In this case, in step S202, the processor 37 changes the frequency of the alternating-current magnetic field to a value different from the currently set value. The value of the changed frequency is, for example, a value different from the resonant frequency (for example, 85 kHz) of magnetic resonance coupling, and may be a value lower than the resonant frequency of magnetic resonance coupling.

Second Embodiment

The configuration and control of a power supply assistance system according to a second embodiment are basically similar to the configuration and control of the power supply assistance system according to the first embodiment except points that will be described below. Therefore, hereinafter, the second embodiment of the present disclosure will be mainly described on portions different from the first embodiment.

Figure 9:
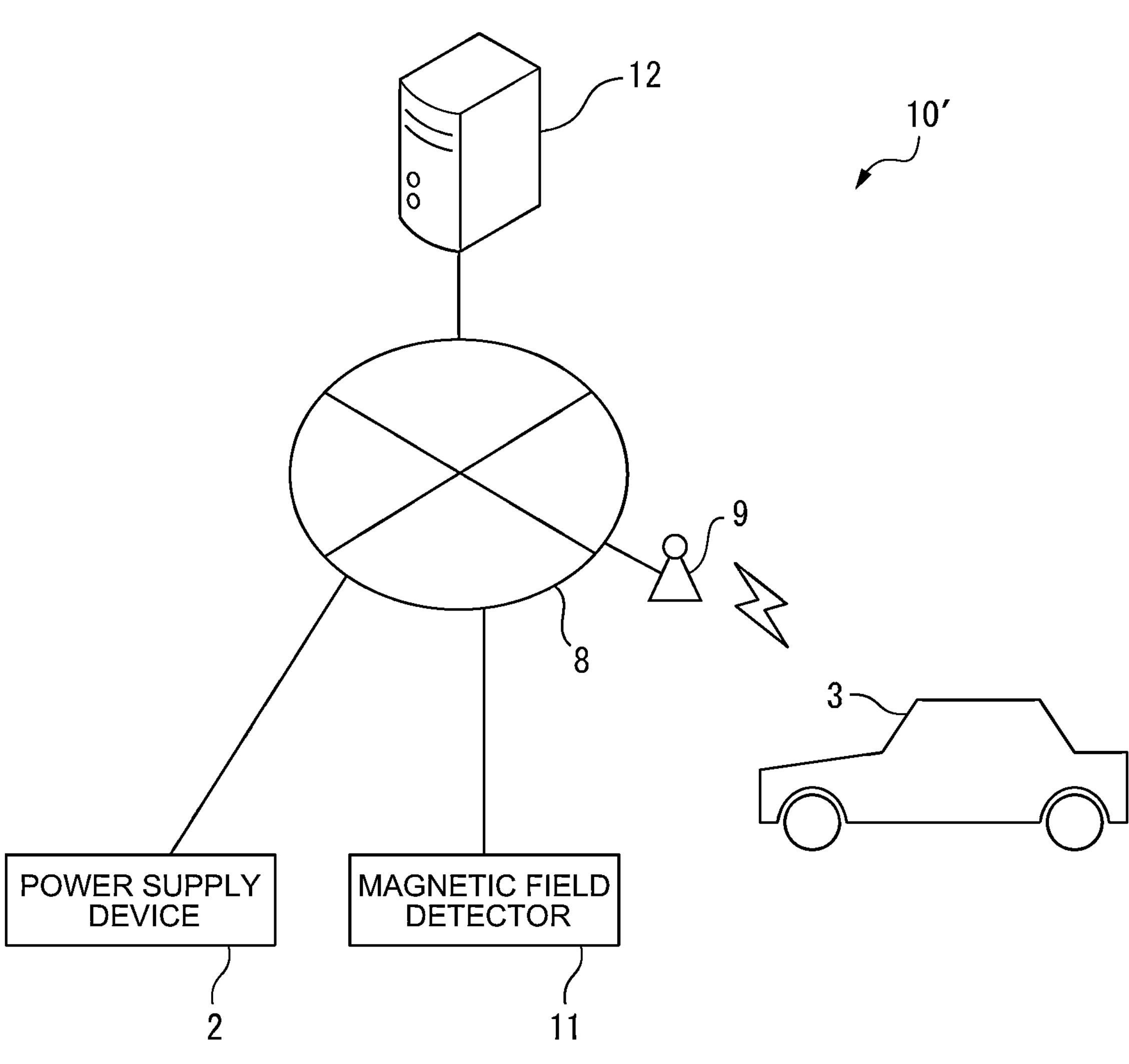
FIG. 9 is a diagram schematically showing a power supply assistance system according to a second embodiment of the present disclosure.

FIG. 9 is a diagram schematically showing the power supply assistance system 10' according to the second embodiment of the present disclosure. As in the case of the first embodiment, the power supply assistance system 10' includes the magnetic field detector 11 and the server 12.

In the second embodiment, the server 12 that functions as a power supply assistance apparatus is capable of communicating with the power supply device 2 via the communication network 8. The frequency change unit 18 of the server 12 instructs the vehicle 3 and the power supply device 2 to change the frequency of an alternating-current magnetic field emitted from the vehicle 3 to the power supply device 2 as a position signal. The controller 22 of the power supply device 2 changes the frequency of an alternating-current magnetic field to be detected, based on an instruction from the server 12. In other words, the controller 22 changes the frequency of the alternating-current magnetic field to be detected, based on a magnetic field around the power supply device 2, detected by the magnetic field detector 11.

FIG. 10 is a flowchart showing a control routine that is executed in the server 12 according to the second embodiment. The control routine is repeatedly executed at predetermined execution intervals by the processor 16 of the server 12. When a plurality of installation areas in which the power supply device 2 is installed and the magnetic field detector 11 is provided, the control routine is executed for each of the installation areas.

Step S301, step S302, step S303, and step S304 are executed similarly to step S101, step S102, step S103, and step S104 in FIG. 7. After step S304, in step S305, the frequency change unit 18 instructs the vehicle 3 and the power supply device 2 to change the frequency of the alternating-current magnetic field emitted to the power supply device 2. Specifically, the frequency change unit 18 instructs the vehicle 3 to change the frequency of the alternating-current magnetic field by transmitting a recommended value of the frequency of the alternating-current magnetic field to the vehicle 3 and the power supply device 2. After step S305, the control routine ends.

Figure 11:
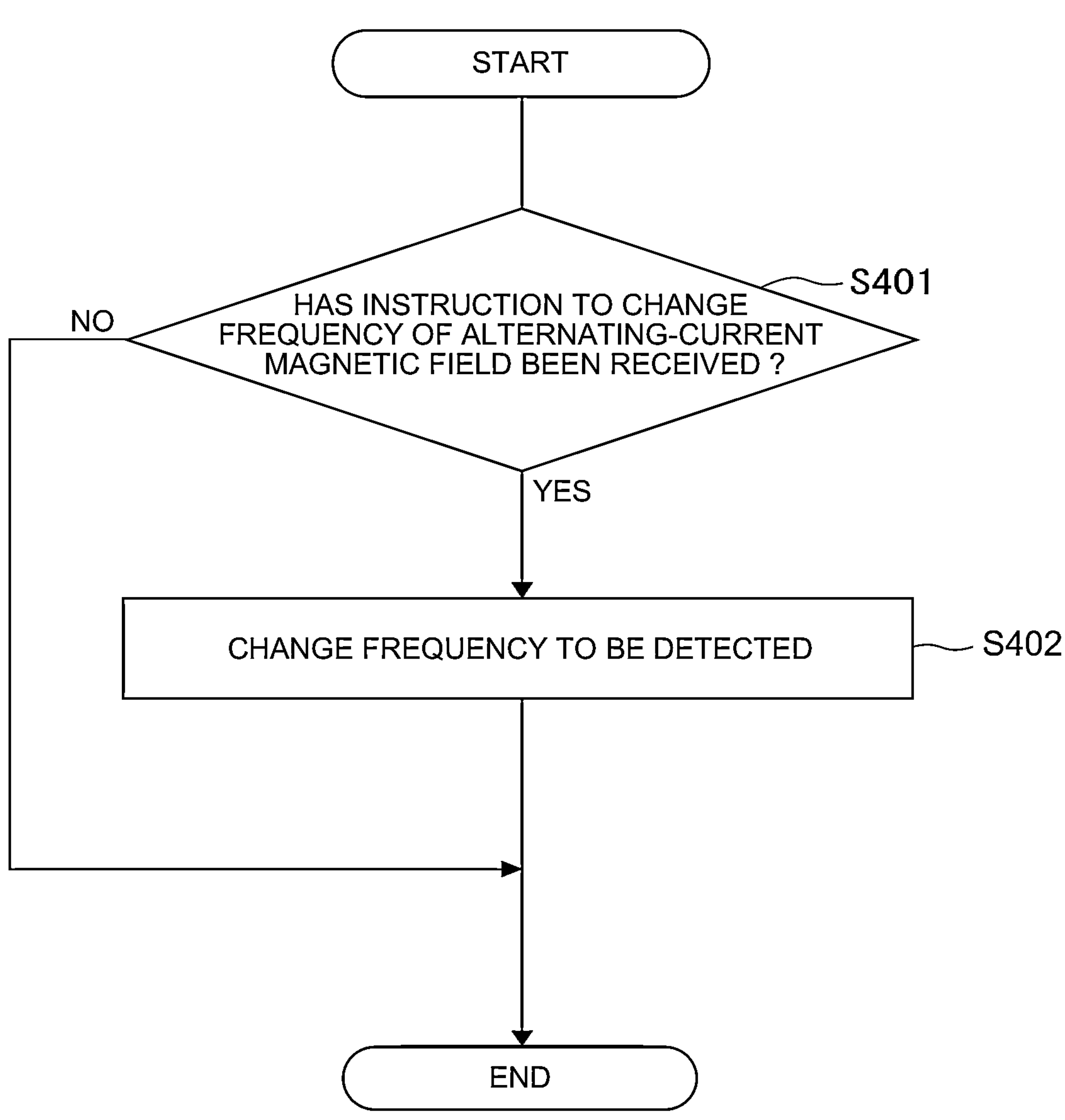
FIG. 11 is a flowchart showing a control routine that is executed in a power supply device according to the second embodiment.

FIG. 11 is a flowchart showing a control routine that is executed in the power supply device 2 according to the second embodiment. The control routine is repeatedly executed at predetermined execution intervals by the processor 24 of the controller 22 of the power supply device 2.

Initially, in step S401, the processor 24 determines whether an instruction to change the frequency of the alternating-current magnetic field has been received from the server 12. When the processor 24 determines that an instruction to change the frequency has not been received, the control routine ends. On the other hand, when the processor 24 determines that an instruction to change the frequency has been received, the control routine proceeds to step S402.

In step S402, the processor 24 changes the frequency of the alternating-current magnetic field, to be detected. Specifically, the processor 24 changes the frequency to be detected from a currently set value to the recommended value transmitted from the server 12. For example, the processor 24 extracts a frequency component to be detected by analyzing the frequency of the output of the vehicle detection device 7 and determines whether the vehicle 3 is approaching the power supply device 2 based on the value (peak value) of the extracted frequency component. In this case, the frequency component to be detected in frequency analysis (for example, Fourier transform) is changed to the recommended value.

The processor 24 may extract a frequency component to be detected by filtering the output of the vehicle detection device 7. In this case, a plurality of filter circuits having different frequency components to be detected is provided between the vehicle detection device 7 and the controller 22, and, of the filter circuits, the filter circuit that extracts a frequency component corresponding to a recommended value is connected to the vehicle detection device 7. After step S402, the control routine ends.

In the second embodiment as well, the control routine shown in FIG. 8 is executed in the vehicle 3 as in the case of the first embodiment.

Third Embodiment

The configuration and control of a power supply assistance system according to a third embodiment are basically similar to the configuration and control of the power supply assistance system according to the first embodiment except points that will be described below. Therefore, hereinafter, the third embodiment of the present disclosure will be mainly described on portions different from the first embodiment.

Figure 12:
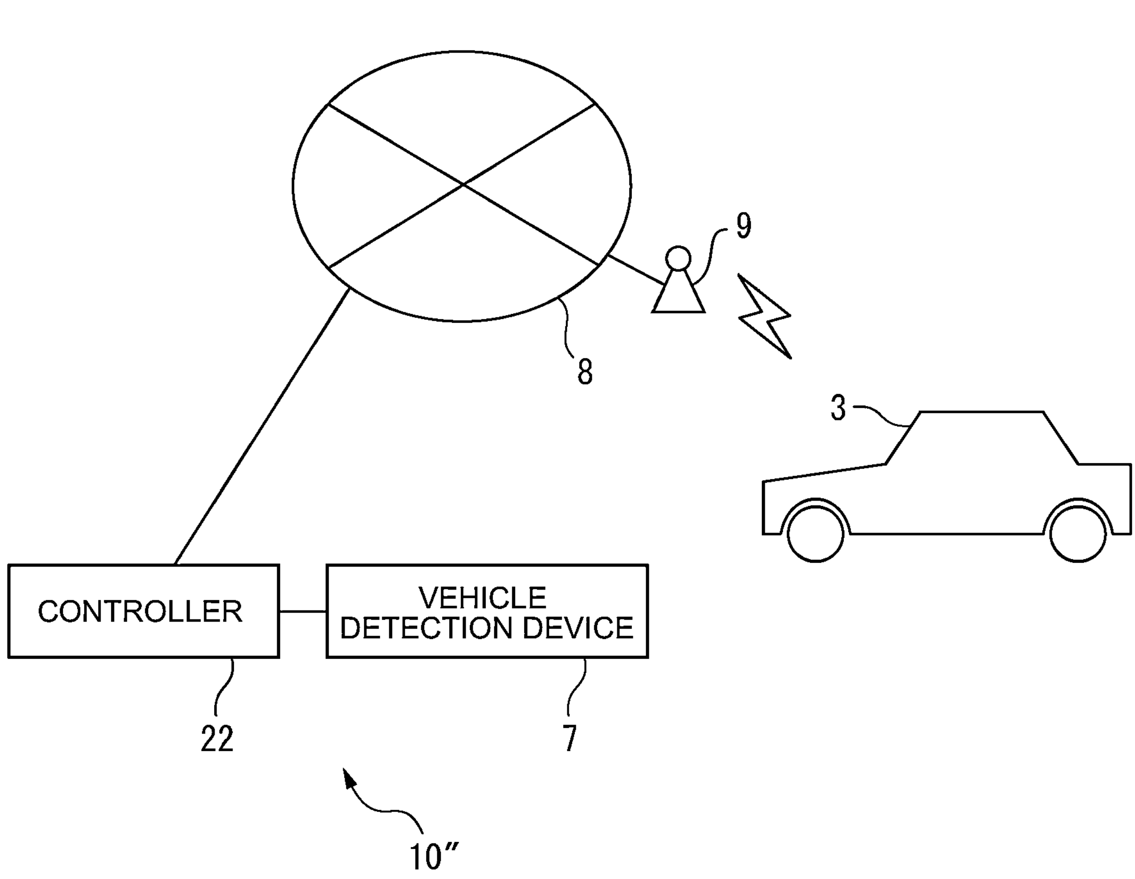
FIG. 12 is a diagram schematically showing a power supply assistance system according to a third embodiment of the present disclosure.

FIG. 12 is a diagram schematically showing a power supply assistance system 10" according to the third embodiment of the present disclosure. In the third embodiment, the power supply assistance system 10" includes the vehicle detection device 7 and the controller 22 of the power supply device 2. In other words, the vehicle detection device 7 functions as a magnetic field detector that detects a magnetic field around the power supply device 2, and the controller 22 functions as a power supply assistance apparatus. The controller 22 has a communication interface, and the controller 22 and the vehicle 3 are capable of communicating with each other via the communication network 8 and the wireless base station 9.

Figure 13:
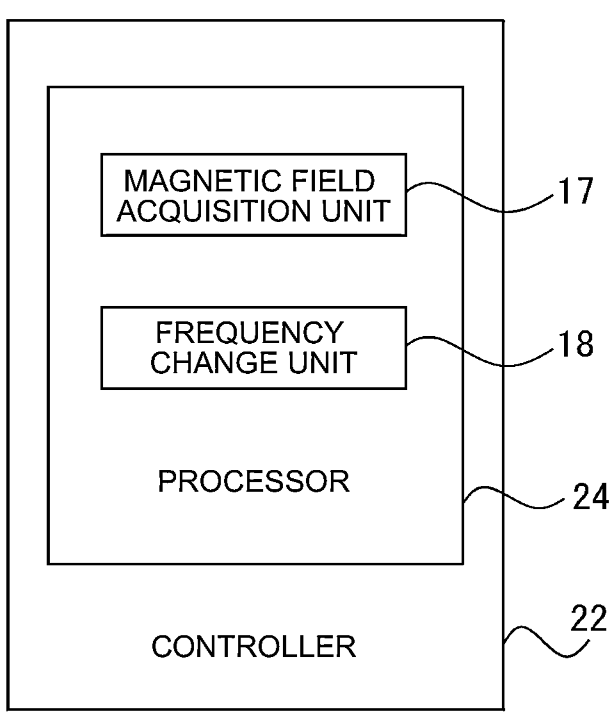
FIG. 13 is a functional block diagram of a processor of a controller according to the third embodiment.

FIG. 13 is a functional block diagram of the processor 24 of the controller 22 according to the third embodiment. In the third embodiment, the processor 24 includes the magnetic field acquisition unit 17 and the frequency change unit 18. The magnetic field acquisition unit 17 and the frequency change unit 18 are function modules implemented by the processor 24 of the controller 22 running a computer program stored in the memory 23 of the controller 22. The magnetic field acquisition unit 17 and the frequency change unit 18 may be implemented by a dedicated arithmetic circuit provided in the processor 24.

In the third embodiment, a control routine shown in FIG. 7 is executed by the processor 24 of the controller 22. At this time, in step S101, the magnetic field acquisition unit 17 acquires the output of the vehicle detection device 7. Step S102, step S103, step S104, and step S105 are executed as described in the first embodiment.

Other Embodiments

As described above, some embodiments of the present disclosure have been described; however, the applicable embodiment is not limited to these embodiments and encompasses various modifications and changes within the scope of the appended claims. For example, the alternating-current magnetic field generating circuit 62 that generates an alternating-current magnetic field as the position signal of the vehicle 3 does not need to use magnetic resonance coupling, so the alternating-current magnetic field generating circuit 62 does not need to include the capacitor 64.

The vehicle 3 may be a hybrid electric vehicle (HEV) or a plug-in hybrid electric vehicle (PHEV) that includes an internal combustion engine and a motor as drive power sources. The vehicle 3 may be an autonomous driving vehicle in which at least part of acceleration, steering, and deceleration (braking) of the vehicle 3 is automatically controlled. The vehicle 3 may be a commercial vehicle, such as a bus and a truck, an automated guided vehicle (AGV), or the like.

A method of supplying electric power in a noncontact manner from the power supply device 2 to the vehicle 3 is not limited to an electromagnetic induction system including a magnetic field resonance system and may be various methods, such as an electric field coupling system that transfers electric power by using an electric field as a medium.

The above-described embodiments may be implemented by any combination. For example, in the first embodiment and the second embodiment, the magnetic field detector 11 may be omitted, and the vehicle detection device 7 of the power supply device 2 may function as a magnetic field detector that detects a magnetic field around the power supply device 2. When the second embodiment and the third embodiment are combined with each other, the control routine shown in FIG. 10 is executed by the processor 24 of the controller 22. At this time, the magnetic field acquisition unit 17 acquires the output of the vehicle detection device 7 in step S301, and the frequency change unit 18 instructs the vehicle 3 to change the frequency of the alternating-current magnetic field and changes the frequency of the alternating-current magnetic field, to be detected, in the power supply device 2 in step S305.

What is claimed is:

1. A power supply assistance system comprising:

a vehicle configured to emit a first alternating-current magnetic field having a predetermined frequency as a position signal including an identification information of the vehicle;

a power supply device installed in a ground configured to supply electric power in a noncontact manner through magnetic resonance coupling in response to the power supply device receiving the first alternating-current magnetic field;

a magnetic field detector installed adjacent to the power supply device and configured to detect a magnetic field around the power supply device; and a power supply assistance apparatus including one or more processors, wherein the one or more processors are configured to:

acquire an output of the magnetic field detector, determine, based on the acquired output, whether the magnetic field around the power supply device includes the identification information, determine whether a second alternating-current magnetic field other than the first alternating-current magnetic field is generated in response to the magnetic field around the power supply device including the identification information, determine whether a difference between a frequency of the first alternating-current magnetic field and a frequency of the second alternating-current magnetic field is less than a predetermined value in response to a determination that the second alternating-current magnetic field is generated, instruct the vehicle and the power supply device to change the frequency of the first alternating-current magnetic field such that the difference between the frequency of the first alternating-current magnetic field and the frequency of the second alternating-current magnetic field is the predetermined value or more in response to a determination that the difference is less than the predetermined value, in response to the vehicle receiving the instruction, the vehicle is configured to change the frequency of the first alternating-current magnetic field emitted by the vehicle, and in response to the power supply device receiving the instruction, the power supply device is configured to supply the electric power in response to the power supply device receiving the first alternating-current frequency having the changed frequency.

2. The power supply assistance system according to claim 1, wherein the one or more processors are configured to instruct the vehicle to change the frequency of the first alternating-current magnetic field by transmitting a recommended value of the frequency of the alternating-current magnetic field to the vehicle.

3. The power supply assistance system according to claim 2, wherein the one or more processors are configured to transmit the recommended value to the vehicle and the power supply device.

4. The power supply assistance system according to claim 2, wherein:

the one or more processors are configured to set the recommended value to a value different from a resonant frequency of the magnetic resonance coupling.

5. The power supply assistance system according to claim 1, wherein the one or more processors are configured to determine that the second alternating-current magnetic field other than the first alternating-current magnetic field is generated in response to the magnetic field around the power supply device not including the identification information of the vehicle.

6. The power supply assistance system according to claim 4, wherein the frequency of the first alternating-current magnetic field is lower than the resonant frequency of the magnetic resonance coupling.

7. The power supply assistance system according to claim 1, wherein the magnetic field detector is placed before a power transmission resonant circuit of the power supply device in a traveling direction of the vehicle.

8. The power supply assistance system according to claim 1, wherein the one or more processors are configured to instruct the vehicle to change the frequency of the first alternating-current magnetic field based on location information of the vehicle indicating that the vehicle is scheduled to be supplied with electric power from the power supply device.

9. The power supply assistance system according to claim 1, wherein the magnetic field detector comprises a magneto-impedance sensor.

* * * * *